US010177936B2

(12) United States Patent
Banavalikar

(10) Patent No.: US 10,177,936 B2
(45) Date of Patent: Jan. 8, 2019

(54) QUALITY OF SERVICE (QOS) FOR MULTI-TENANT-AWARE OVERLAY VIRTUAL NETWORKS

(71) Applicant: International Business Machines Corporation, Armonk, NY (US)

(72) Inventor: Bhalachandra G. Banavalikar, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 14/229,692

(22) Filed: Mar. 28, 2014

(65) Prior Publication Data

US 2015/0281099 A1     Oct. 1, 2015

(51) Int. Cl.
*H04L 12/46*     (2006.01)
*H04L 12/24*     (2006.01)

(52) U.S. Cl.
CPC ...... *H04L 12/4666* (2013.01); *H04L 12/4633* (2013.01); *H04L 12/4641* (2013.01); *H04L 41/0893* (2013.01); *H04L 41/12* (2013.01); *H04L 41/5022* (2013.01)

(58) Field of Classification Search
CPC ..... H04L 12/4633; H04L 45/74; H04L 45/00; H04L 69/22; H04L 45/66; H04L 47/12; H04W 28/0268; H04W 28/0289; H04W 28/0215; H04W 84/12
USPC ....................................... 370/401, 389, 230
See application file for complete search history.

(56) References Cited

U.S. PATENT DOCUMENTS

| | | | | |
|---|---|---|---|---|
| 2003/0152075 | A1* | 8/2003 | Hawthorne, III | ... H04L 12/4641 370/389 |
| 2007/0147378 | A1* | 6/2007 | Elgebaly | ............. H04L 63/0272 370/392 |
| 2010/0290398 | A1* | 11/2010 | Choudhary | ........... H04L 12/465 370/328 |
| 2011/0225303 | A1* | 9/2011 | Engebretson | ......... H04L 47/193 709/227 |
| 2013/0051399 | A1* | 2/2013 | Zhang | ..................... H04L 47/12 370/401 |
| 2013/0297768 | A1 | 11/2013 | Singh | |

(Continued)

FOREIGN PATENT DOCUMENTS

WO     WO2013184121     12/2013

*Primary Examiner* — Andrew W Chriss
*Assistant Examiner* — Atique Ahmed
(74) *Attorney, Agent, or Firm* — Zilka-Kotab, P.C.

(57) ABSTRACT

In one embodiment, a system includes a switch having logic configured to receive an overlay packet via an overlay tunnel, the overlay packet including an overlay tunnel header having Quality of Service (QoS) attributes stored therein and a packet, remove the QoS attributes from the overlay tunnel header, decapsulate the packet from the overlay packet to remove the overlay tunnel header, determine a destination port from the packet, and forward the packet to the destination port. In another embodiment, a method includes receiving a packet on a source port, determining a virtual network associated with the source port, encapsulating the packet with at least one overlay tunnel header to form an overlay packet, storing QoS attributes with the at least one overlay tunnel header, the QoS attributes being determined in part by the virtual network, and sending the overlay packet via an overlay tunnel.

17 Claims, 9 Drawing Sheets

(56) References Cited

U.S. PATENT DOCUMENTS

2014/0153572 A1* 6/2014 Hampel .............. H04L 12/6418
370/392
2015/0195178 A1* 7/2015 Bhattacharya ........ H04L 45/745
718/1

* cited by examiner

QUALITY OF SERVICE (QOS) FOR MULTI-TENANT-AWARE OVERLAY VIRTUAL NETWORKS

BACKGROUND

The present invention relates to virtual networking, and more particularly, this invention relates to implementing Quality of Service (QoS) for packets in a multi-tenant-aware overlay virtual network.

Overlay Virtual Networks (OVNs) use protocol headers that are encapsulated in packets on top of the original network packet to create location transparency. Most OVNs, such as an OVN which uses Virtual eXtensible Local Area Network (VXLAN), Network Virtualization using Generic Routing Encapsulation (NVGRE), or others, adheres to this encapsulation scheme. Due to the additional encapsulation protocol headers, it is not possible for existing or legacy Inter-Networking Elements (INEs), such as physical infrastructure routers and switches, among others, to determine information from within the original packet, such as QoS information. This is because the original packet inside of the overlay protocol headers is encapsulated as a traditional data payload to the legacy INEs. Furthermore, this lack of visibility of the original packet prevents INEs from implementing sophisticated network security and services.

Protocols like VXLAN use User Datagram Protocol/Internet Protocol (UDP/IP) to encapsulate the original Ethernet packet for transmission over physical networks. The original Ethernet packets are tunneled through the network from an originator to a nearest VXLAN gateway. VXLAN gateways connect virtual networks to non-virtual networks (legacy networks having physical components). Since VXLAN gateways understand (are capable of processing) VXLAN protocol and tunnels, they have the capability to identify the encapsulated packets. However, currently, these gateways are not capable of applying services or security to traffic flowing therethrough.

Furthermore, OVNs allow creation of independent virtual networks on a pertenant basis. These virtual networks utilize and share the same physical networking hardware which may or may not be aware of network virtualization. Typically, such physical networking devices inspect a network packet's Ethernet header and Internet Protocol (IP) header in order to make QoS decisions. At a server level, traffic generated by Virtual Machines (VMs), regardless of the virtual network it is attached to or correlated with, is encapsulated by an overlay-capable device, such as a virtual switch in a hypervisor using a tunneling specific protocol, such as VXLAN, NVGRE, etc., used to implement the OVN fabric. Since packets from each VM are treated as payload inside outer tunnel-specific packets, QoS attributes provided by VM packets are not visible to the underlay physical network shared by the OVNs. Therefore, existing pure encapsulation methods for OVN traffic lack an efficient mechanism to honor committed Service Level Agreements (SLAs) for a given overlay virtual network associated with a specific tenant.

Therefore, an efficient and reliable method to provide QoS on a per-tenant basis in a multi-tenant-aware OVN would be very beneficial.

SUMMARY

In one embodiment, a system includes a first switch having logic integrated with and/or executable by a first processor, the logic being configured to: receive an overlay tunnel-encapsulated packet via an overlay tunnel, the overlay tunnel-encapsulated packet including at least one overlay tunnel header having Quality of Service (QoS) attributes stored therein and a packet, remove the QoS attributes from the at least one overlay tunnel header, decapsulate the packet from the overlay tunnel-encapsulated packet to remove the at least one overlay tunnel header, determine a destination port from the packet, and forward the packet to the destination port.

In another embodiment, a method for providing QoS to packets in an overlay virtual network (OVN) includes: receiving a packet on a source port, determining a virtual network associated with the source port, encapsulating the packet with at least one overlay tunnel header to form an overlay tunnel-encapsulated packet, storing QoS attributes with the at least one overlay tunnel header, the QoS attributes being determined at least in part by the virtual network, and sending the overlay tunnel-encapsulated packet via an overlay tunnel.

In yet another embodiment, a computer program product for providing QoS to packets in an OVN includes a computer readable storage medium having program instructions embodied therewith, the program instructions executable by a processor to cause the processor to: receive, by the processor, a packet on a source port, determine, by the processor, a virtual network associated with the source port, encapsulate, by the processor, the packet with at least one overlay tunnel header to form an overlay tunnel-encapsulated packet, store, by the processor, QoS attributes with the at least one overlay tunnel header, the QoS attributes being determined at least in part by the virtual network, and send, by the processor, the overlay tunnel-encapsulated packet via an overlay tunnel.

Other aspects and embodiments of the present invention will become apparent from the following detailed description, which, when taken in conjunction with the drawings, illustrate by way of example the principles of the invention.

DETAILED DESCRIPTION

Figure 1:
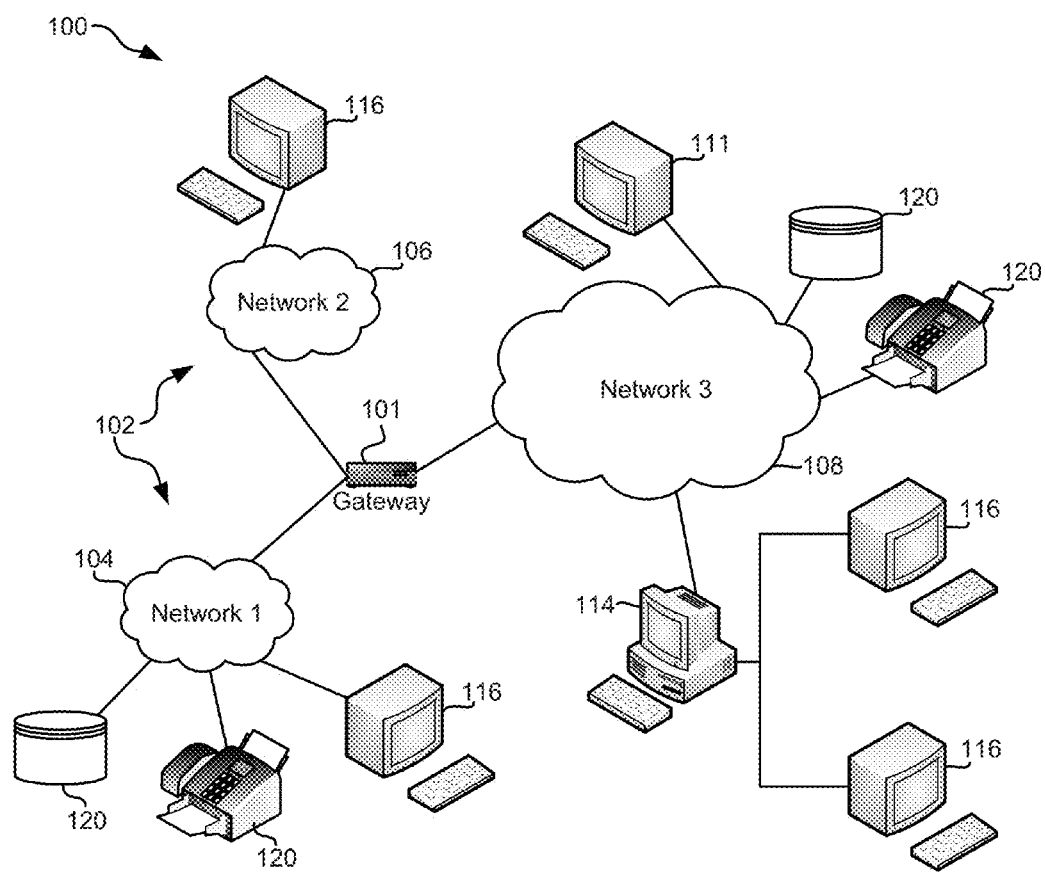
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to one embodiment, a network administrator is allowed to configure Quality of Service (QoS) attributes at a per-tenant or a virtual network level, and provides for a virtual switch to enforce these QoS attributes, such as at a hypervisor level, during encapsulation of Virtual Machine (VM) packets, depending upon the virtual network to which the VM is attached.

In one general embodiment, a system includes a first switch having logic integrated with and/or executable by a first processor, the logic being configured to: receive an overlay tunnel-encapsulated packet via an overlay tunnel, the overlay tunnel-encapsulated packet including at least one overlay tunnel header having QoS attributes stored therein and a packet, remove the QoS attributes from the at least one overlay tunnel header, decapsulate the packet from the overlay tunnel-encapsulated packet to remove the at least one overlay tunnel header, determine a destination port from the packet, and forward the packet to the destination port.

In another general embodiment, a method for providing QoS to packets in an overlay virtual network (OVN) includes: receiving a packet on a source port, determining a virtual network associated with the source port, encapsulating the packet with at least one overlay tunnel header to form an overlay tunnel-encapsulated packet, storing QoS attributes with the at least one overlay tunnel header, the QoS attributes being determined at least in part by the virtual network, and sending the overlay tunnel-encapsulated packet via an overlay tunnel.

In yet another general embodiment, a computer program product for providing QoS to packets in an OVN includes a computer readable storage medium having program instructions embodied therewith, the program instructions executable by a processor to cause the processor to: receive, by the processor, a packet on a source port, determine, by the processor, a virtual network associated with the source port, encapsulate, by the processor, the packet with at least one overlay tunnel header to form an overlay tunnel-encapsulated packet, store, by the processor, QoS attributes with the at least one overlay tunnel header, the QoS attributes being determined at least in part by the virtual network, and send, by the processor, the overlay tunnel-encapsulated packet via an overlay tunnel.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/group ware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VM WARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
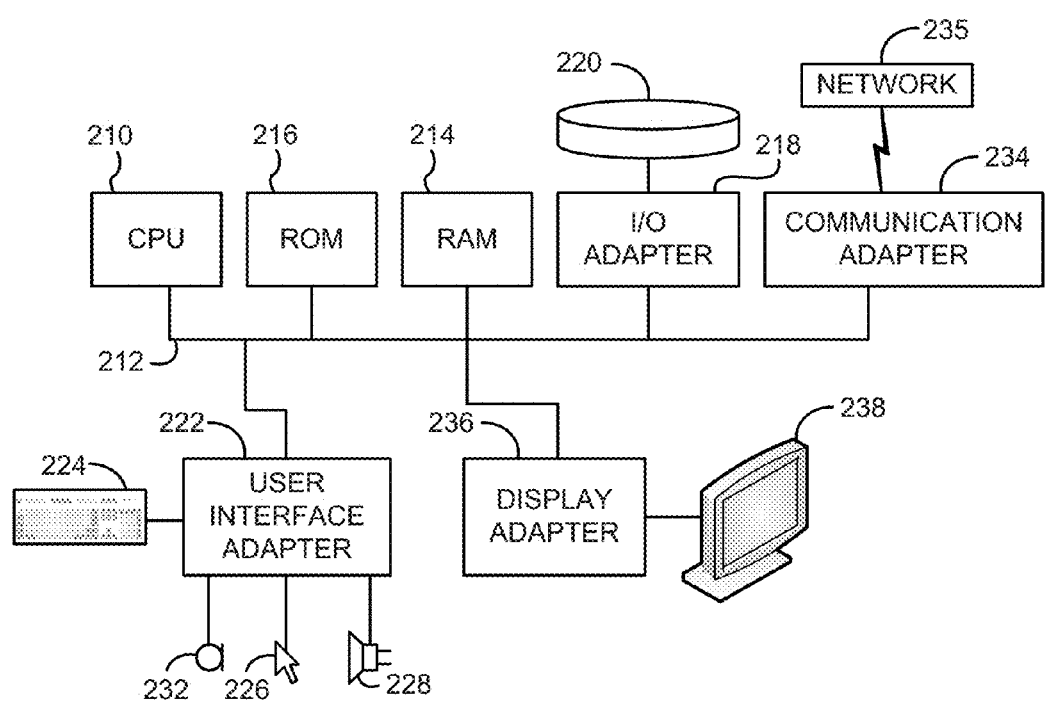
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
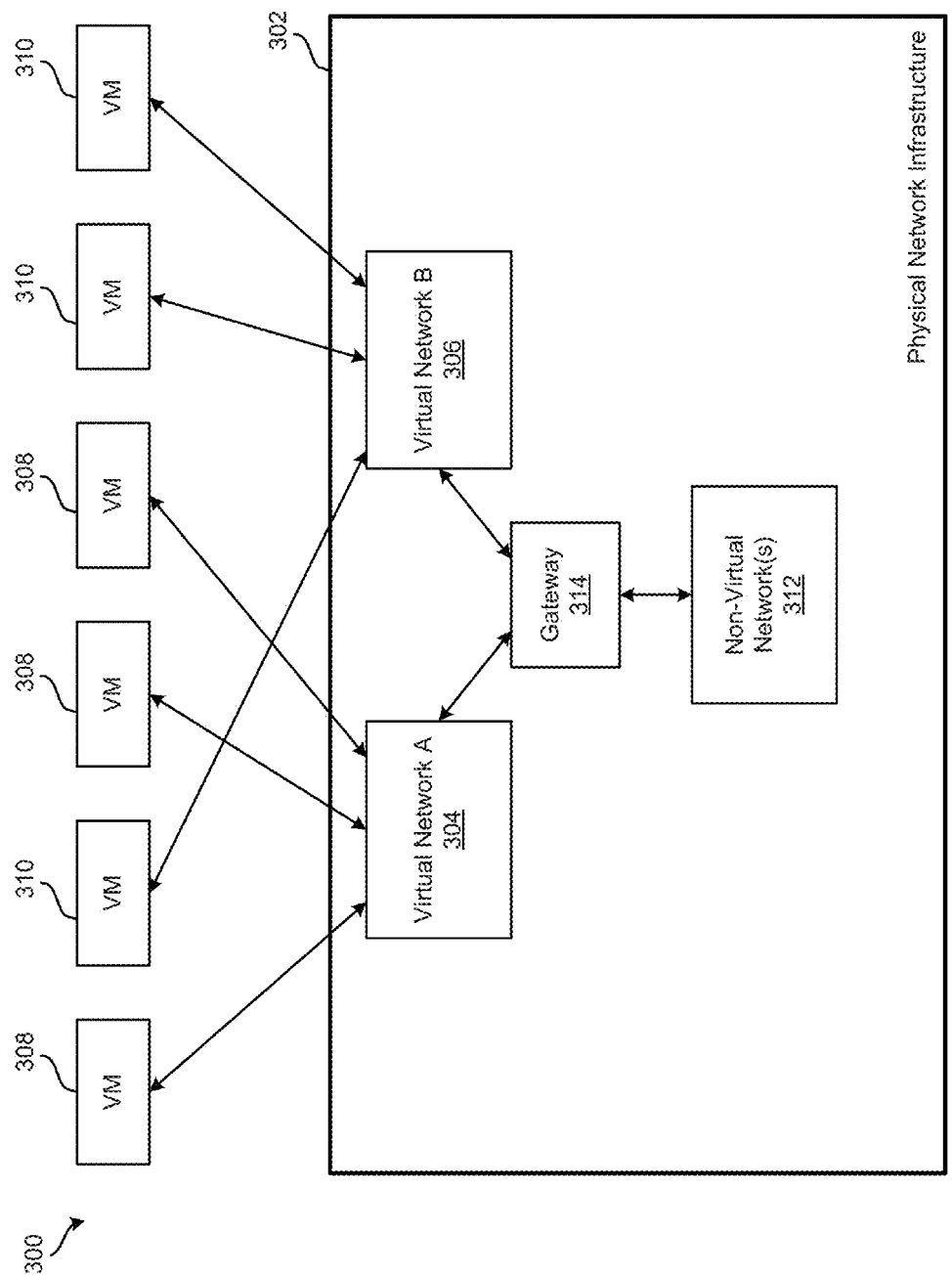
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if it the architecture is similar to a large flat switch, in a very large layer 2-domain, then the VMs are aided in their attempt to move data across the architecture.

According to one approach, QoS attributes from VM-originated network packet headers may be implemented at an encapsulation layer by copying the virtual network specific QoS attributes to the tunnel specific network packet headers. However, this approach allows some entity, such as a server administrator or a workload administrator, to provision any level of QoS for specific workload applications regardless of the virtual network or tenant specific Service Level Agreement (SLA). Further, this approach may possibly allow a rogue VM or an erroneous workload to grab valuable network resources and starve other VMs of the limited network resources, thereby impacting other tenant's SLAs, sometimes severely. Accordingly, an approach to copy a VM packet's QoS to a tunnel specific packet's QoS is not an efficient nor effective way to implement QoS in a multi-tenant-aware OVN.

Figure 4:
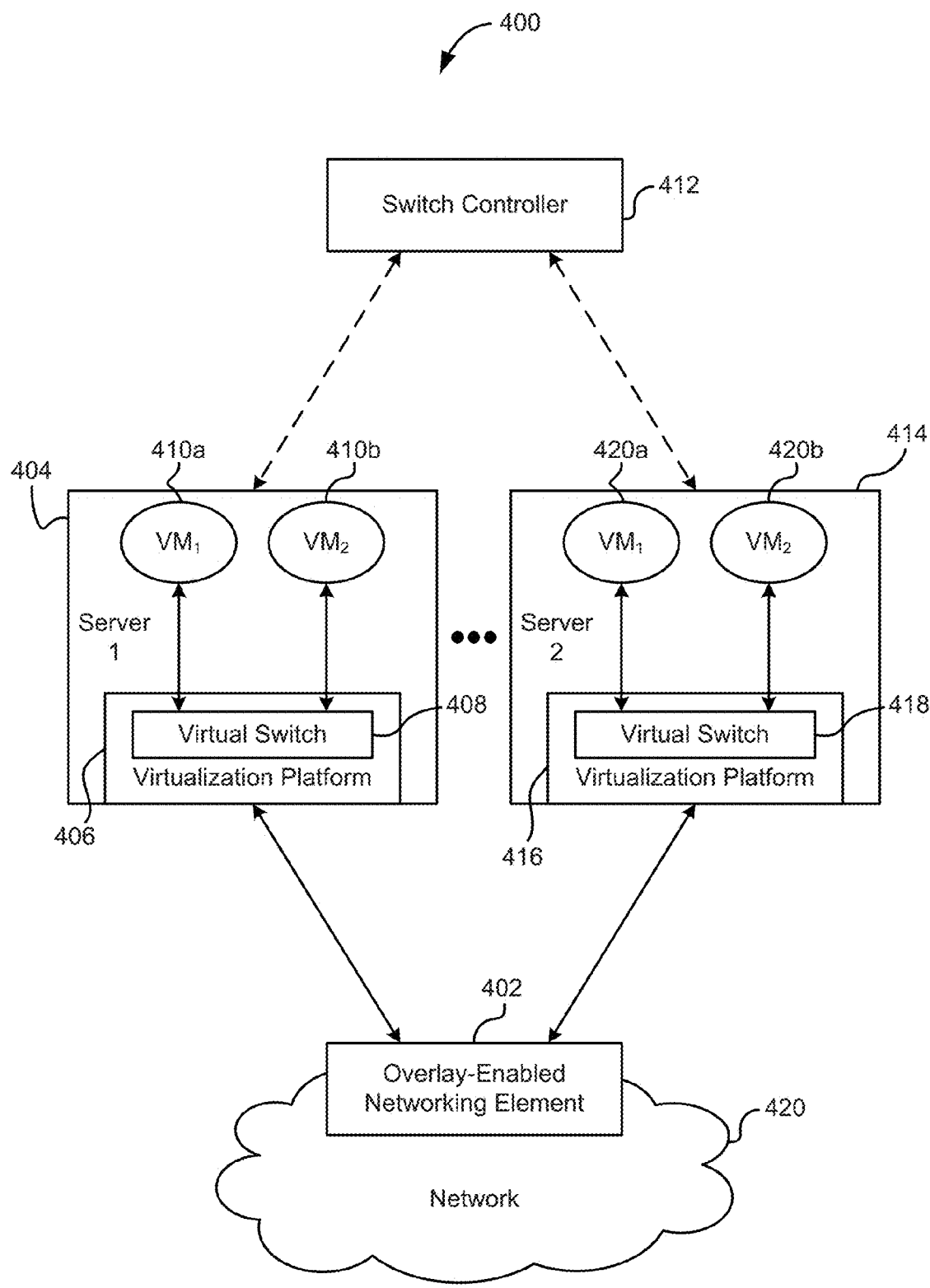
FIG. 4 is a simplified diagram of connectivity between virtual network(s) and non-virtual network(s), according to the prior art.

FIG. 4 shows a portion of a system 400 according to one embodiment. In this system 400, a switch controller 412 is configured to communicate with at least some of the virtual switches 408, 418 in the system 400. The switch controller 412 is configured to set configuration settings in each of the virtual switches 408, 418. The system 400 includes a plurality of servers (e.g., Server 1 404, Server 2 414, etc.), with each server including a virtual switch (e.g., virtual switch 408, virtual switch 418, etc.) and a virtualization platform, such as a hypervisor (e.g., virtualization platform 406, virtualization platform 416, etc.). In addition, each server 404, 414, is configured to host one or more virtual machines (VMs) (e.g., $VM_1$ 410a, 420a, $VM_2$ 410b, 420b, etc.), each VM being configured to perform some predetermined task or function, which appears on the system 400 as a workload.

The various servers 404, 414, are configured to communicate via one or more overlay-enabled networking elements 402 with a network 420 that comprises other networking elements, such as routers, switches, servers, VMs, etc., and other known networking elements and devices. The network 420 may be a physical Layer-2 (L3) and/or Layer-3 (L3) network in some approaches.

The one or more overlay-enabled networking elements 402 may be any networking device capable of receiving and understanding at least overlay-tunneled packets and Ethernet packets. Other types of packets may also be received and/or understood, such as storage network packets, Transmission Control Protocol/Internet Protocol (TCP/IP) packets, user datagram protocol (UDP) packets, etc. Furthermore, the one or more overlay-enabled networking elements 402 are capable of sending overlay-tunneled packets and Ethernet packets by encapsulating Ethernet packets (or other packet types) with an overlay tunnel header, and stripping the overlay tunnel header from overlay-encapsulated packets to produce Ethernet packets (or other packet types) which are encapsulated as payload therein.

Figure 5:
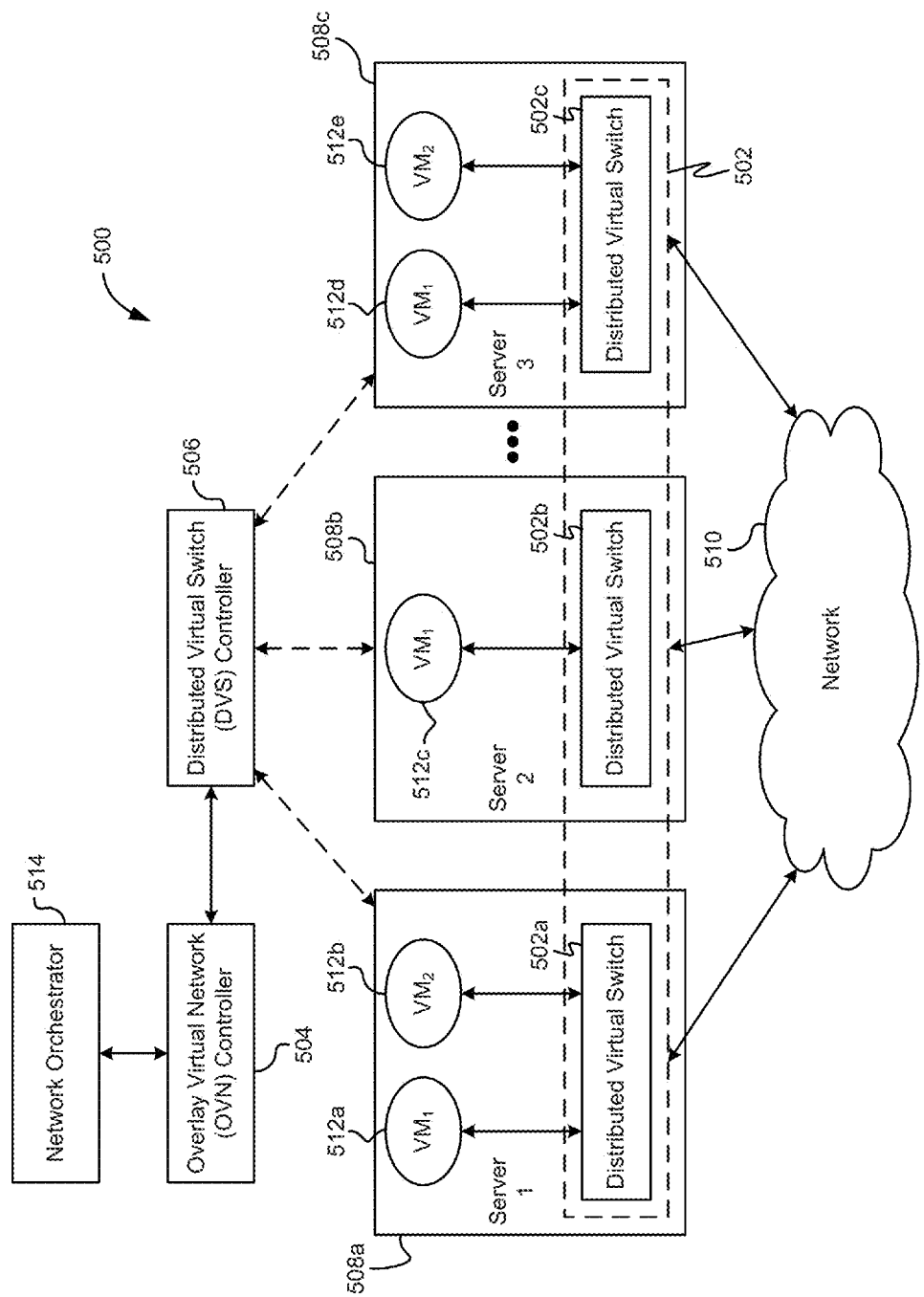
FIG. 5 shows simplified connectivity between virtual network(s) and non-virtual network(s), according to one embodiment.

FIG. 5 shows a portion of a system 500 which utilizes at least one distributed virtual switch (DVS) 502. The DVS 502 is hosted by one or more servers, e.g., Server 1 508a, Server 2 508b, Server 3 508c, etc. Each server hosts a portion of the DVS 502, e.g., Server 1 508a hosts DVS portion 502a, Server 2 508b hosts DVS portion 502b, and Server 3 508c hosts DVS portion 502c. The system 500 also comprises an overlay virtual network (OVN) controller 504 in communication with a DVS controller 506 which is in communication with the DVS 502, and a network 510 connected to the DVS 502 via one of its hosting servers 508a, 508b, 508c, etc.

The network 510 comprises networking elements, such as routers, switches, servers, VMs, etc., and other known networking elements and devices. The network 510 may be a physical L2 and/or L3 network in some approaches.

Each server 508a, 508b, 508c, may also comprise one or more VMs, such as Server 1 508a hosting $VM_1$ 512a and $VM_2$ 512b, Server 2 508b hosting $VM_1$ 512c, and Server 3 508c hosting $VM_1$ 512d and $VM_2$ 512e. Each VM 512a-512e is capable of performing some task or function which may appear as a workload to the network 510, the DVS controller 506, and/or the OVN controller 504, etc.

In one embodiment, a network orchestrator 514 (such as an administrator, OpenStack, etc) may provide information to the OVN controller 504 in order to configure port profiles for the various portions of the DVS 502. This information may include QoS application programming interface(s)—API(s)—and/or some other suitable information which allows for the OVN controller 504 and the DVS controller 506 to implement QoS enforcement on packets sent from one of the DVS portions 502a, 502b, 502c, etc.

In one embodiment, the DVS controller 506 may communicate with the DVS 502 via one or more intermediary devices, such as a workload orchestrator (not shown). This workload orchestrator may be any device configured to communicate with the DVS portions 502a-502c to allow setting of port profiles within the DVS portions 502a-502c, configuration of the switch settings, etc. In one embodiment, when VMware is used to configure the DVS 502, the workload orchestrator may be a vCenter server.

According to various embodiments described herein, a virtual network-specific QoS control path may be implemented in either or both of system 400 shown in FIG. 4 and/or system 500 shown in FIG. 5. In either case, the orchestrator applies a Service Level Agreement (SLA) that has been agreed upon for the particular tenant and/or virtual network(s) which has a level or levels of service that is to be provided to traffic for the particular tenant and/or corresponding virtual network(s). This SLA may be on a per-tenant basis (where each tenant is represented by a single virtual network, or each tenant is represented by more than one virtual network, but no virtual network is shared by multiple tenants), such that there are one or more SLAs for each tenant in the network.

The SLA may dictate data rates, throughput, jitter, and/or other known measurable details about traffic handling in the network. According to this SLA, the orchestrator then causes all traffic that emanates from the particular tenant and/or corresponding virtual network(s) to have this level or levels of service applied to it. To this end, the orchestrator may provide QoS attributes, according to the SLA, to be applied to any traffic emanating from the particular tenant and/or corresponding virtual network(s).

The QoS attributes may include any information, criteria, and/or factor, and may be communicated in any previously established way. For example, the QoS attributes may include Institute of Electrical and Electronics Engineers (IEEE) 802.1p information configured to provide traffic class expediting and dynamic multicast filtering mechanisms for a particular tenant and/or virtual network(s). In another example, the QoS attributes may include IEEE 802.1q information configured to provide VLAN tagging capability in the packet headers of traffic sent from a particular tenant and/or virtual network(s). In yet another example, the QoS attributes may include a Differentiated Services Code Point (DSCP) value in a certain field of packet headers (such as a 6-bit field, 8-bit field, etc.) configured to designate traffic classification.

The QoS attributes may be communicated to the OVN controller using QoS interfaces of the OVN controller, to the DVS controller using any communication protocol between the OVN controller and the DVS controller, or via any other known communication path available in the network to any other controller or device capable of ensuring that the QoS attributes are applied to traffic which emanates from the particular tenant and/or corresponding virtual network(s).

The QoS attributes that apply to the particular tenant and/or corresponding virtual networks's) may be agreed upon prior to implementation, such as via the SLA, to ensure that self-reported QoS attributes are not being taken from packets that originate from the particular tenant and/or corresponding virtual network(s), but instead that the network orchestrator is determining the QoS attributes for each tenant and/or corresponding virtual network(s).

The OVN controller may maintain an association between the particular tenant and/or corresponding virtual network(s) and the QoS attributes agreed upon in the SLA or via some other agreement of service. This association may be stored in a database, table, list, or via some other known storage construct, such that the association between the particular tenant and/or corresponding virtual network(s) and the agreed-upon QoS attributes may be determined from a simple search on the database, table, list, etc.

In addition, as the QoS attributes change over time, due to restructuring in service agreements, due to inaccessibility of certain level(s) of service, and/or due to additional level(s) of service being added, the changes to the QoS attributes may be reflected in this database, table, list, etc.

The OVN controller may then communicate the QoS attributes to one or more DVS controllers, ensuring that any DVS controller receives the QoS attributes for the particular tenant when that DVS controller manages a DVS where the presence of workload(s) from one of the corresponding virtual networks is possible. The presence of the one or more workloads may be determined based on traffic having been received that specifies one of the corresponding virtual networks and/or via a learned association which is programmed into the DVS, such as via the DVS controller or some other switch controller.

After the QoS attributes, as agreed upon in the SLA, have been communicated to the DVS controller(s) via the OVN controller, each of the affected DVS controllers communicates the agreed-upon QoS attributes for the particular tenant and/or corresponding virtual network(s) to all virtualized servers where the presence of workload(s) from one of the corresponding virtual networks is possible. Again, this presence of the workload(s) may be known or learned.

After being programmed to apply the QoS attributes to certain traffic that emanates from the particular tenant and/or corresponding virtual network(s), each DVS associates the one or more corresponding virtual networks to virtual network interface cards (vNICs) which are virtually connected to the one or more corresponding virtual networks.

A similar implementation is possible for a software-defined network (SDN) using a SDN controller, such as an OpenFlow controller, to communicate with the various switches (whether physical, virtual, or distributed) within a network where the presence of workload(s) from one of the corresponding virtual networks is possible. Them, each of the switches is configured, via the SDN controller, to apply the agreed-upon QoS to any traffic which emanates from the particular tenant and/or corresponding virtual network(s).

In order to ensure that the QoS attributes are enforced on a per-tenant basis, some form of transmission-based enforcement may be implemented. In one embodiment, when a DVS receives a packet (which originated from a VM hosted by a server) from a vNIC port attached to a corresponding virtual network that corresponds to the particular tenant, the packet may be encapsulated with one or more overlay tunnel protocol header(s), depending on the overlay tunnel protocol being used. Any suitable overlay tunneling protocol known in the art may be used to implement the overlay virtual network, such as Virtual extensible Local Area Network (VXLAN), Network Virtualization using Generic Routing Encapsulation (NVGRE), etc.

In this encapsulation procedure, a virtual network indicator may be appended to an outer media access control (MAC) header of the overlay tunnel protocol header(s) in order to identify which virtual network the traffic emanated from, which may be used to also identify a corresponding tenant. This virtual network identifier, in one approach, may comprise a VLAN tag (which may adhere to IEEE 802.1q or some other suitable VLAN tagging standard) which is appended to an end of the outer MAC header.

Then, the DVS retrieves QoS attributes associated with the vNIC on which the packet was received. These QoS attributes may be stored in a vNIC database, table, list, etc., which provides an association between the vNIC port and corresponding agreed-upon QoS attributes for the particular tenant and/or corresponding virtual network(s). These QoS attributes may adhere to IEEE 802.1p standards, DSCP, and/or any other suitable QoS attribute identification protocol and/or standard known in the art.

After the QoS attributes are retrieved, they are applied to an outer header of the overlay tunnel protocol header(s). For example, when the virtual network identifier is a VLAN tag, QoS attributes may be 802.1p values which are applied to the outer VLAN tag 802.1p fields. In this example, the default VLAN identifier may be populated in the VLAN ID field, as would be understood by one of skill in the art.

Furthermore, when the QoS attributes include DSCP values, the DSCP values may be applied to the outer IP header of the overlay tunnel protocol header(s). In this way, since all of the QoS attributes are reflected in one of the outer headers of the overlay tunnel-encapsulated packet, any intermediate devices in the network which receive the packet will be able to determine the QoS attributes of the overlay tunnel-encapsulated packet and treat it accordingly, without needing to decapsulate the overlay tunnel-encapsulated packet or perform deep packet inspection thereon.

After the QoS attributes are reflected in the outer header(s) of the overlay tunnel-encapsulated packet, the overlay tunnel-encapsulated packet is sent out on an uplink port connected to a physical underlay network. In this way, the overlay tunnel-encapsulated packet carries SLA-specific QoS attributes in at least one L2 header (in the packet in the payload) and at least one L3 header (in the outer overlay tunnel protocol header(s)). The overlay tunnel-encapsulated packet leaves via the uplink of the virtualized server or some other overlay-capable intermediary device (which acts as the source of the tunnel). All physical networking devices in the network path from the source of the tunnel to a destination of the tunnel inspect the outer L2/L3 headers in order to properly apply QoS and provide QoS specific network resources for the traffic. The overlay tunnel-encapsulated packet eventually arrives at the destination of the tunnel and hits the uplink of a second virtualized server (or some other suitable device).

Once the overlay tunnel-encapsulated packet arrives at the end of the tunnel (which may be a virtualized server, physical server, switch, router, or some other overlay-capable device known in the art), the outer header(s) of the overlay tunnel-encapsulated packet (along with any IEEE 802.1q header) is removed. Then, the destination vNIC port is looked up based on the destination MAC stored in the original packet. After the vNIC port for the DMAC is determined, the original packet is forwarded to the vNIC for delivery to its destination.

A similar implementation is possible for a SDN where any overlay-capable device may receive the overlay tunnel-encapsulated packet, decapsulate the packet to retrieve the original packet, and based on the DMAC stored in the original packet, look up the destination NIC port (whether virtual or physical). After the NIC port for the DMAC is determined, the original packet is forwarded to the appropriate NIC for delivery to its destination.

Figure 6A:
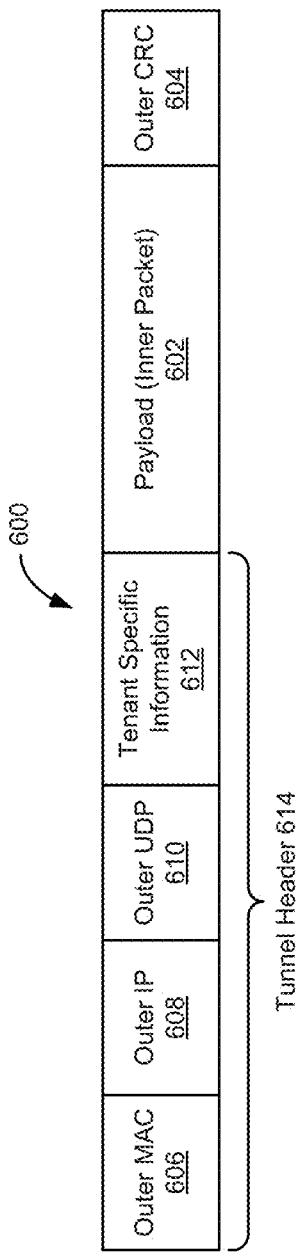
FIGS. 6A-B depicts a simplified flow through a virtual overlay network gateway, according to one embodiment.
Figure 6B:
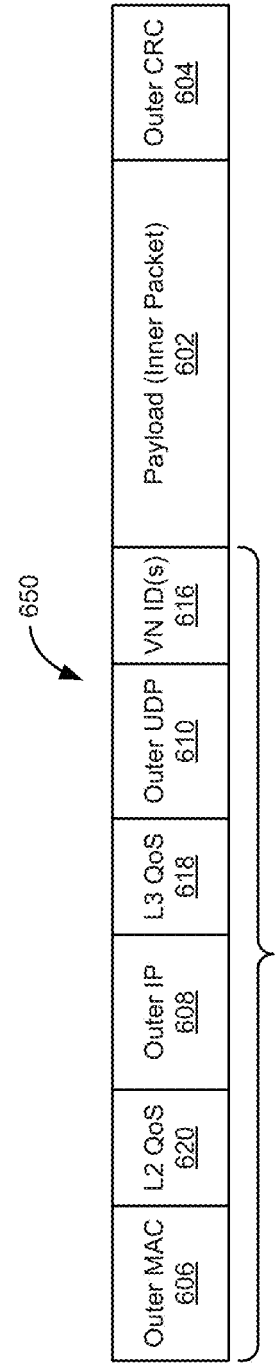

Now referring to FIGS. 6A-B, an overlay tunnel-encapsulated packet 600 is shown according to one embodiment. The overlay tunnel-encapsulated packet 600 is used to encapsulate an inner packet as payload 602 in the overlay tunnel-encapsulated packet 600. In order to accomplish this encapsulation, the overlay tunnel-encapsulated packet 600 may include one or more overlay tunnel protocol headers 614 along with some form of error correction for the overlay tunnel protocol headers 614, such as an outer cyclic redundancy check (CRC) 604 or some other error correction coding known in the art.

For example, as shown in FIG. 6A, the overlay tunnel-encapsulated packet 600 may comprise an outer MAC header 606 (including a source MAC address and a destination MAC address), an outer IP header 608 (including a source IP address and a destination IP address), an outer UDP header 610 (which may also include overlay virtual network protocol information, such as VXLAN-specific information, NVGRE-specific information, etc.), and tenant-specific information 612.

The tenant specific information 612 may include any virtual network identifiers, VLAN tags, IEEE 802.1p values, IEEE 802.1q values, DSCP values, delay, throughput, and reliability (DTR) values, etc.

Now referring to FIG. 6B, an overlay tunnel-encapsulated packet 650 is shown according to another embodiment. The overlay tunnel-encapsulated packet 650 is used to encapsulate an inner packet as payload 602 in the overlay tunnel-encapsulated packet 650. In order to accomplish this encapsulation, the overlay tunnel-encapsulated packet 650 may include one or more overlay tunnel protocol headers 614 along with some form of error correction for the overlay tunnel protocol headers 614, such as an outer CRC 604 or some other error correction coding known in the art.

For example, as shown in FIG. 6B, the overlay tunnel-encapsulated packet 650 may comprise an outer MAC header 606 (including a source MAC address and a destination MAC address), an outer IP header 608 (including a source IP address and a destination IP address), and an outer UDP header 610 (which may also include overlay virtual network protocol information, such as VXLAN-specific information, NVGRE-specific information, etc.).

Furthermore, the overlay tunnel-encapsulated packet 650 may comprise one or more virtual network identifiers (VN IDs) 616, such as VLAN tags, appended to an end of the outer UDP header 610, or in some other agreed upon location in the overlay tunnel protocol header 614. The VLAN tag(s) may be in the form of IEEE 802.1q values, IEEE 802.1p values, or some other recognizable virtual network identifier known in the art and/or agreed upon during network initialization.

In another embodiment, the overlay tunnel-encapsulated packet 650 may comprise a Layer-2 (L2) QoS field 620 (which may include L2 priority information, such as from 802.1q tagging and/or 802.1p priority indication), which may be inserted after the outer MAC header 606 or in some other agreed upon location in the overlay tunnel protocol header 614. The L2 QoS field 620 is configured to store L2 priority information for the inner packet 602.

In addition, the overlay tunnel-encapsulated packet 650 may comprise a Layer-3 (L3) QoS field 618 which may include some form and/or indication of a type of service (TOS) value or some other suitable field that indicates L3 priority information for the inner packet 602. In one embodiment, the L3 QoS field 618 may be configured to store DSCP and/or DTR values, as would be understood by one of skill in the art. The L3 QoS field 618 may include information related to QoS attributes to apply to the overlay tunnel-encapsulated packet 650 based on the inner packet in the payload 602. The L3 QoS field 618 may be located after the outer IP header 608 or in some other agreed upon location in the overlay tunnel protocol header 614.

Figure 7:
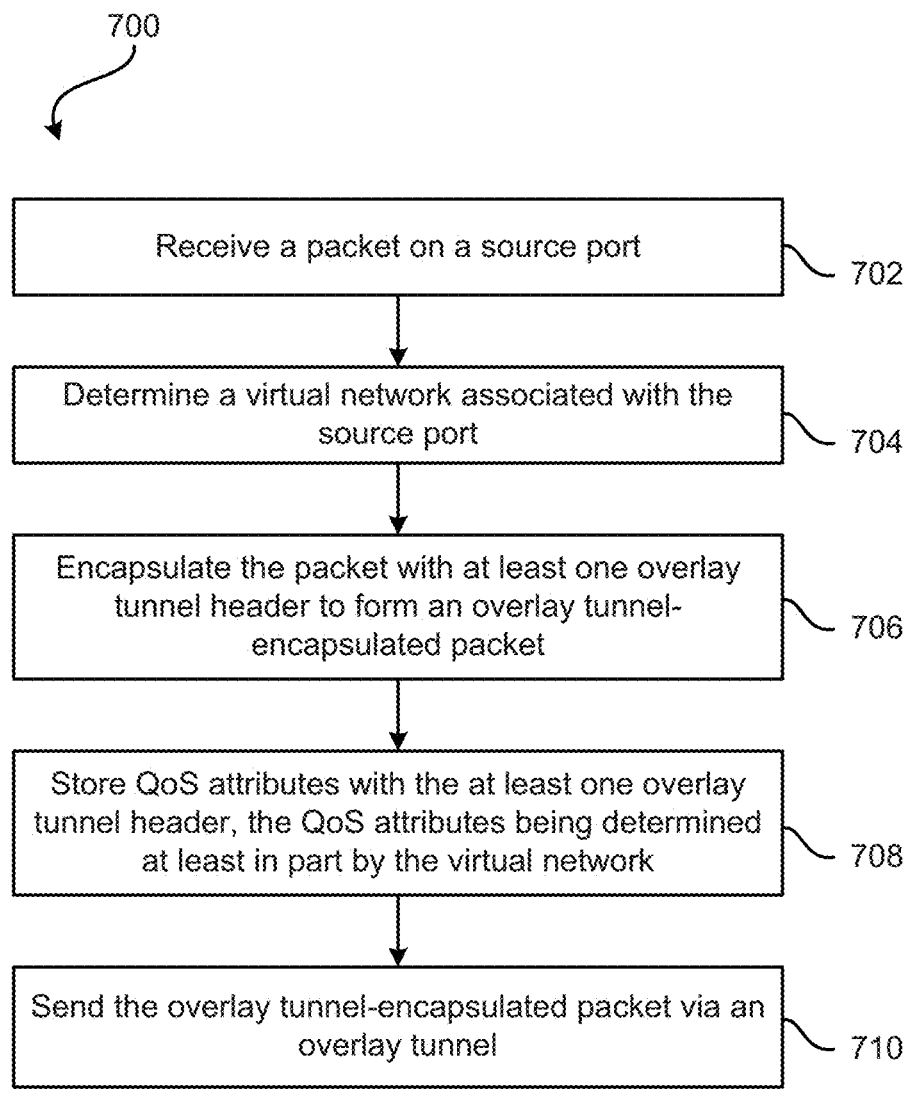
FIG. 7 depicts a simplified flow through an overlay network device, according to one embodiment.

Now referring to FIG. 7, a flowchart of a method 700 is shown according to one embodiment. The method 700 may be performed in accordance with the present invention in any of the environments depicted in FIGS. 1-6B, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by an OVN device such as an OVN controller, a SDN controller, a DVS, a DVS controller, an OVN gateway, an INE, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a packet is received on a source port. Method 700 may be implemented when any single packet or group of packets (e.g., a stream of data) is received on the source port, and may be repeated for each received packet and/or group of packets. The packet may be any type of packet known in the art, such as an Ethernet packet, a storage area network packet, an IP packet, etc. The source port may be physical (e.g., on a NIC) or virtual (e.g., on a vNIC), and may be part of a physical, virtual, or distributed virtual switch, on a router, in an overlay gateway, in a server, etc.

The packet may be sent from (and subsequently received from) a local VM, a remote VM, or generated from within some other device known in the art.

In operation 704, a virtual network associated with the source port is determined.

The packet may include a VLAN tag of a type known in the art in a header of the packet, in one approach. Also, the determining the virtual network associated with the source port may include determining the VLAN tag included in the header of the packet in a further approach.

In one embodiment, the virtual network associated with the source port may be determined from QoS attributes included in a header of the packet, when such QoS attributes are included, such as a VLAN tag, DSCP values, a traffic class, etc. However, it is better when the QoS attributes are independently provided by another source other than the packet's source, such as from a switch controller, and OVN controller, a DVS controller, etc.

In operation 706, the packet is encapsulated with at least one overlay tunnel header to form an overlay tunnel-encapsulated packet. This encapsulation process may be performed according to any known overlay tunneling protocol known in the art, such as VXLAN, NVGRE, etc.

In operation 708, QoS attributes are stored with, in, between, and/or outside of the at least one overlay tunnel header, the QoS attributes being determined at least in part by the virtual network.

The QoS attributes to store with the at least one overlay tunnel header may be determined by consulting a first table, the first table storing virtual network identifiers associated with QoS attributes. This first table may be referred to as a port database, as it correlates each local port on a device with a virtual network identifier, thereby allowing for any traffic received on correlated ports to be treated as traffic emanating from that particular tenant and/or virtual network(s) associated therewith.

In one approach, a virtual network identifier of the virtual network associated with the source port may be appended to an end of an outer MAC header of the overlay tunnel-encapsulated packet, and/or a traffic classification value may be appended to an end of an outer IP header of the overlay tunnel-encapsulated packet.

In a further embodiment, the QoS attributes may include at least one of: a VLAN tag according to IEEE 802.1q, a DSCP value, and a traffic class value according to IEEE 802.1p. Of course, more types of QoS attributes are possible, and this simple list is not meant to limit the types of QoS attributes that may be stored with the overlay tunnel header. In this embodiment, the VLAN tag may be appended to an end of an outer MAC header of the overlay tunnel-encapsulated packet, and the DSCP value may be appended to an end of an outer IP header of the overlay tunnel-encapsulated packet. By appended, what is meant is that space which is unused after storage of the particular header may be used to store the various pieces of QoS attributes, thereby allowing for this information to be conveyed without requiring substantial changes to an overlay tunnel protocol.

In operation 710, the overlay tunnel-encapsulated packet is sent via an overlay tunnel, as would be understood by one of skill in the art. Accordingly, whichever device is sending the overlay tunnel-encapsulated packet should be overlay-capable, in order to originate and/or terminate the overlay tunnel.

Figure 8:
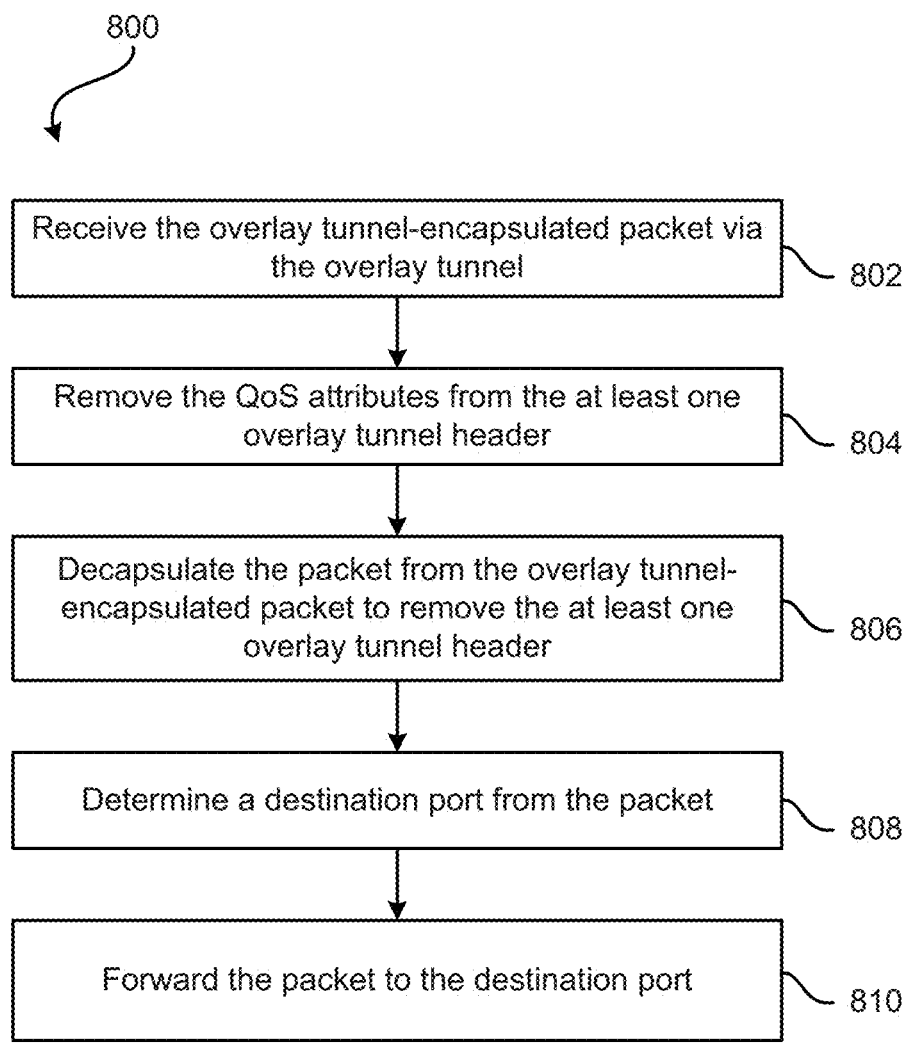
FIG. 8 is a flowchart of a method, according to one embodiment.

Now referring to FIG. 8, a flowchart of a method 800 is shown, according to one embodiment. The method 800 may be performed in accordance with the present invention in any of the environments depicted in FIGS. 1-6B, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by an OVN device such as an OVN controller, a SDN controller, a DVS, a DVS controller, an OVN gateway, an INE, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where the overlay tunnel-encapsulated packet is received via the overlay tunnel. Method 800 may be implemented when any single packet or group of packets (e.g., a stream of data) is received, and may be repeated for each received packet and/or group of packets. Any suitable overlay-capable device may receive the overlay tunnel-encapsulated packet, such as a physical, virtual, or distributed virtual switch, overlay gateway, server, router, etc.

In operation 804, the QoS attributes are removed from the at least one overlay tunnel header, according to any technique known in the art for stripping such information. In one implementation, the information is stored and then may be compared to similar values which may be within the payload of the overlay tunnel-encapsulated packet (an inner packet), so as to confirm whether the packet was provided with appropriate QoS or not.

In operation 806, the packet is decapsulated from the overlay tunnel-encapsulated packet to remove the at least one overlay tunnel header. This decapsulation process may be performed according to any process known in the art, and may depend upon the particular overlay protocol used. For example, an overlay tunnel-encapsulated packet which adheres to VXLAN may require different decapsulation processes than an overlay tunnel-encapsulated packet which adheres to NVGRE.

In operation 808, a destination port is determined from the packet, using any known process to make such a determination. For example, the destination port may be stored in a header of the inner packet (packet) within the overlay tunnel-encapsulated packet.

In operation 810, the packet is forwarded to the destination port, as would be understood by one of skill in the art using any known forwarding technique.

Figure 9:
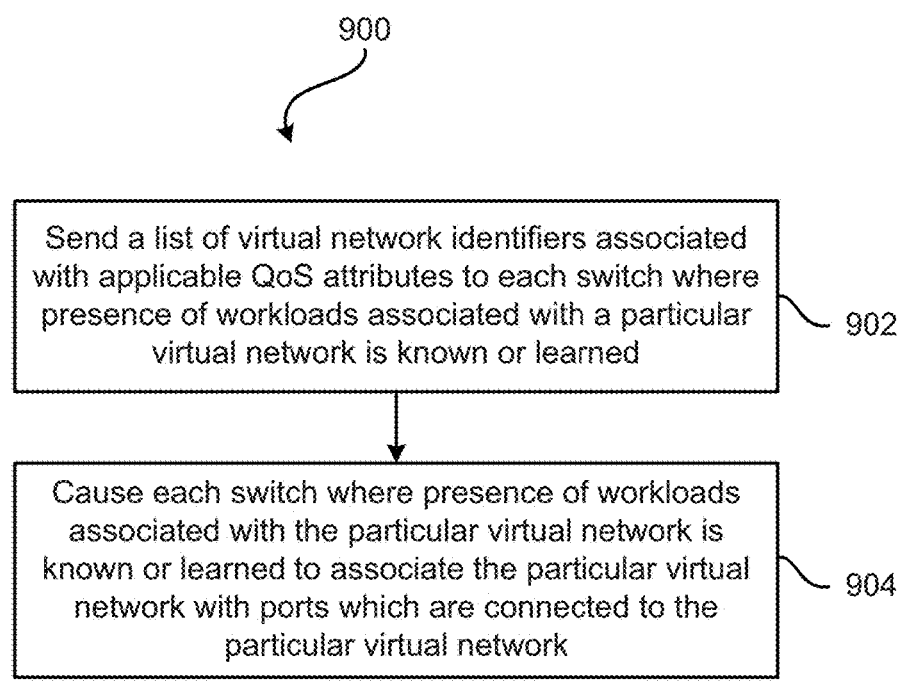
FIG. 9 is a flowchart of a method, according to one embodiment.

Now referring to FIG. 9, a flowchart of a method 900 is shown, according to one embodiment. The method 900 may be performed in accordance with the present invention in any of the environments depicted in FIGS. 1-6B, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by an OVN device such as an OVN controller, a SDN controller, a DVS, a DVS controller, an OVN gateway, an INE, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a list of virtual network identifiers associated with applicable QoS attributes are sent to each switch where presence of workloads associated with a particular virtual network is known or learned.

In operation 904, each switch where presence of workloads associated with the particular virtual network is known or learned are caused to associate the particular virtual network with ports which are connected to the particular virtual network.

In this way, when any packet is received which indicates one of the stored virtual network identifiers, this packet may be treated according to any QoS attributes stored with the indicated virtual network identifier. For example, when a VLAN tag is sued as the virtual network identifier, any packet that is received having that VLAN tag stored to an overlay tunnel header of the overlay tunnel-encapsulated packet, this overlay tunnel-encapsulated packet has the corresponding QoS attributes applied thereto in processing of the overlay tunnel-encapsulated packet.

In one embodiment, the same device or processor may perform methods 700, 800, and 900 as described in FIGS. 7-9. In an alternate embodiment, different devices within a network may perform methods 700, 800, and 900 as described in FIGS. 7-9. For example, a first switch (physical, virtual, or DVS) may execute method 700 in FIG. 7, a second switch (physical, virtual, or DVS) may execute method 800 in FIG. 8, and a controller (e.g., switch controller, DVS controller, OVN controller, etc.) may execute method 900 in FIG. 9.

In another embodiment, a computer program product may be configured to execute one, some, or all of the methods 700, 800, and 900 described in FIGS. 7-9. For example, a computer program product for providing QoS to packets in an OVN may include a computer readable storage medium having program instructions embodied therewith, the program instructions executable by a processor to cause the processor to perform any of the methods described above.

In another embodiment, a system may be configured to execute one, some, or all of the methods 700, 800, and 900 described in FIGS. 7-9. For example, the system may comprise a first switch comprising logic integrated with and/or executable by a first processor, the logic being configured to: receive an overlay tunnel-encapsulated packet via an overlay tunnel, the overlay tunnel-encapsulated packet comprising: at least one overlay tunnel header having QoS attributes stored therein and a packet, remove the QoS attributes from the at least one overlay tunnel header, decapsulate the packet from the overlay tunnel-encapsulated packet to remove the at least one overlay tunnel header, determine a destination port from the packet, and forward the packet to the destination port.

Furthermore, the system may comprise a second switch comprising logic integrated with and/or executable by a second processor, the logic being configured to: receive the packet on a source port from a VM, determine a virtual network associated with the source port, encapsulate the packet with the at least one overlay tunnel header to form the overlay tunnel-encapsulated packet, store the QoS attributes with the at least one overlay tunnel header, the QoS attributes being determined at least in part by the virtual network, and send the overlay tunnel-encapsulated packet via the overlay tunnel to the first switch.

The first and second switches may be overlay-capable physical switches, virtual switches, and/or DVSs, according to various approaches.

The system, in further embodiments, may include a switch controller comprising logic integrated with and/or executable by a third processor, the logic being configured to: send a list of virtual network identifiers associated with applicable QoS attributes to each switch where presence of workloads associated with a particular virtual network is known or learned, and cause each switch where presence of workloads associated with the particular virtual network is known or learned to associate the particular virtual network with ports which are connected to the particular virtual network.

In any of these embodiments, the packet may include a VLAN tag in a header of the packet, and the logic configured to determine the virtual network associated with the source port may include determining the VLAN tag included in the header of the packet.

Furthermore, in some approaches, the QoS attributes to store with the at least one overlay tunnel header may be determined by consulting a first table, the first table storing virtual network identifiers associated with QoS attributes.

In another approach, the virtual network associated with the source port may be determined from QoS attributes included in a header of the packet. Furthermore, in one approach, a virtual network identifier of the virtual network associated with the source port may be appended to an end of an outer MAC header of the overlay tunnel-encapsulated packet, and/or a traffic classification value may be appended to an end of an outer IP header of the overlay tunnel-encapsulated packet.

In another approach, the QoS attributes may include at least one of: a VLAN tag according to IEEE 802.1q, a DSCP value, and a traffic class value according to IEEE 802.1p. Furthermore, in some approaches, the VLAN tag may be appended to an end of an outer MAC header of the overlay tunnel-encapsulated packet, and the DSCP value may be appended to an end of an outer IP header of the overlay tunnel-encapsulated packet.

The approaches described herein allow for a flexible scheme that honors the committed network resource SLAs on a per-tenant basis. In addition, since the QoS information sharing is orchestrated by a controller, it provides instantaneous enforcement of QoS for all workloads per tenant regardless of how the workloads are distributed across the data center network. Also, since the QoS information sharing is being enforced at a switch or virtual switch level, an individual VM and/or workload is not allowed to dictate or control network QoS for its traffic and thereby is not able to take unfair advantage of the limited network resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation, Thus, the breadth and scope of a preferred embodiment should not be limited by any of the above-described exemplary embodiments, but should be defined only in accordance with the following claims and their equivalents.

What is claimed is:

1. A system, comprising:
a first switch comprising logic integrated with and/or executable by a first processor, the logic being configured to:
receive an overlay tunnel-encapsulated packet via an overlay tunnel, the overlay tunnel-encapsulated packet comprising:
at least one overlay tunnel header having Quality of Service (QoS) attributes stored therein, and
a packet;
remove the QoS attributes from the at least one overlay tunnel header;
decapsulate the packet from the overlay tunnel-encapsulated packet to remove the at least one overlay tunnel header;
determine a destination port from the packet; and
forward the packet to the destination port; and
a second switch, the second switch comprising logic integrated with and/or executable by a second processor, the logic being configured to:
receive the packet on a source port from a virtual machine (VM);
determine a virtual network associated with the source port;
encapsulate the packet with the at least one overlay tunnel header to form the overlay tunnel-encapsulated packet;
store the QoS attributes with the at least one overlay tunnel header, the QoS attributes being determined at least in part by the virtual network; and
send the overlay tunnel-encapsulated packet via the overlay tunnel to the first switch,
wherein the QoS attributes to store with the at least one overlay tunnel header are determined by consulting a first table, the first table storing virtual network identifiers associated with QoS attributes.

2. The system as recited in claim 1, wherein the packet includes a virtual local area network (VLAN) tag in a header of the packet, and wherein the logic configured to determine the virtual network associated with the source port comprises determining the VLAN tag included in the header of the packet.

3. The system as recited in claim 1, wherein the virtual network associated with the source port is determined from QoS attributes included in a header of the packet.

4. A system, comprising:
a first switch comprising logic integrated with and/or executable by a first processor, the logic being configured to:
receive an overlay tunnel-encapsulated packet via an overlay tunnel, the overlay tunnel-encapsulated packet comprising:
at least one overlay tunnel header having Quality of Service (QoS) attributes stored therein, and
a packet;
remove the QoS attributes from the at least one overlay tunnel header;
decapsulate the packet from the overlay tunnel-encapsulated packet to remove the at least one overlay tunnel header;
determine a destination port from the packet; and
forward the packet to the destination port; and
a second switch, the second switch comprising logic integrated with and/or executable by a second processor, the logic being configured to:
receive the packet on a source port from a virtual machine (VM);
determine a virtual network associated with the source port;
encapsulate the packet with the at least one overlay tunnel header to form the overlay tunnel-encapsulated packet;
store the QoS attributes with the at least one overlay tunnel header, the QoS attributes being determined at least in part by the virtual network; and
send the overlay tunnel-encapsulated packet via the overlay tunnel to the first switch, wherein the virtual network associated with the source port is determined from QoS attributes included in a header of the packet, wherein a virtual network identifier of the virtual network associated with the source port is appended to an end of an outer media access control (MAC) header of the overlay tunnel-encapsulated packet, and wherein a traffic classification value is appended to an end of an outer internet protocol (IP) header of the overlay tunnel-encapsulated packet.

5. The system as recited in claim 1, further comprising a switch controller, the switch controller comprising logic integrated with and/or executable by a third processor, the logic being configured to:

send a list of virtual network identifiers associated with applicable QoS attributes to each switch where presence of workloads associated with a particular virtual network is known or learned; and cause each switch where presence of workloads associated with the particular virtual network is known or learned to associate the particular virtual network with ports which are connected to the particular virtual network.

6. The system as recited in claim 1, wherein the at least one overlay tunnel header having QoS attributes stored therein comprises a Layer-2 (L2) QoS field storing L2 QoS attributes including L2 priority information for the packet and a Layer-3 (L3) QoS field storing L3 QoS attributes including a type of service (TOS) value indicating L3 priority information, and wherein the L2 and L3 QoS attributes comprise at least one of: a virtual local area network (VLAN) tag according to Institute of Electrical and Electronics Engineers (IEEE) 802.1q, a Differentiated Services Code Point (DSCP) value, and a traffic class value according to IEEE 802.1p.

7. A system, comprising:

a first switch comprising logic integrated with and/or executable by a first processor, the logic being configured to:

receive an overlay tunnel-encapsulated packet via an overlay tunnel, the overlay tunnel-encapsulated packet comprising:

at least one overlay tunnel header having Quality of Service (QoS) attributes stored therein; and a packet;

remove the QoS attributes from the at least one overlay tunnel header;

decapsulate the packet from the overlay tunnel-encapsulated packet to remove the at least one overlay tunnel header;

determine a destination port from the packet; and forward the packet to the destination port, wherein the at least one overlay tunnel header having QoS attributes stored therein comprises a Layer-2 (L2) QoS field storing L2 QoS attributes including L2 priority information for the packet and a Layer-3 (L3) QoS field storing L3 QoS attributes including a type of service (TOS) value indicating L3 priority information, and wherein the L2 and L3 QoS attributes comprise at least one of: a virtual local area network (VLAN) tag according to Institute of Electrical and Electronics Engineers (IEEE) 802.1q, a Differentiated Services Code Point (DSCP) value, and a traffic class value according to IEEE 802.1p, wherein the VLAN tag is appended to an end of an outer media access control (MAC) header of the overlay tunnel-encapsulated packet, and wherein the DSCP value is appended to an end of an outer internet protocol (IP) header of the overlay tunnel-encapsulated packet.

8. A method for providing quality of service (QoS) to packets in an overlay virtual network (OVN), the method comprising:

receiving a packet on a source port;

determining a virtual network associated with the source port;

encapsulating the packet with at least one overlay tunnel header to form an overlay tunnel-encapsulated packet;

storing QoS attributes with the at least one overlay tunnel header, the QoS attributes being determined at least in part by the virtual network; and sending the overlay tunnel-encapsulated packet via an overlay tunnel, wherein the QoS attributes to store with the at least one overlay tunnel header are determined by consulting a first table, the first table storing virtual network identifiers associated with QoS attributes.

9. The method as recited in claim 8, further comprising:

receiving the overlay tunnel-encapsulated packet via the overlay tunnel;

removing the QoS attributes from the at least one overlay tunnel header;

decapsulating the packet from the overlay tunnel-encapsulated packet to remove the at least one overlay tunnel header;

determining a destination port from the packet; and forwarding the packet to the destination port.

10. The method as recited in claim 8, further comprising:

sending a list of virtual network identifiers associated with applicable QoS attributes to each switch where presence of workloads associated with a particular virtual network is known or learned; and causing each switch where presence of workloads associated with the particular virtual network is known or learned to associate the particular virtual network with ports which are connected to the particular virtual network.

11. The method as recited in claim 8, wherein the packet is received from a local virtual machine (VM) on the source port which includes a virtual local area network (VLAN) tag in a header of the packet, and wherein the determining the virtual network associated with the source port comprises determining the VLAN tag included in the header of the packet.

12. The method as recited in claim 8, wherein the at least one overlay tunnel header having QoS attributes stored therein comprises a Layer-2 (L2) QoS field storing L2 QoS attributes including L2 priority information for the packet and a Layer-3 (L3) QoS field storing L3 QoS attributes including a type of service (TOS) value indicating L3 priority information, and wherein the L2 and L3 QoS attributes comprise at least one of: a virtual local area network (VLAN) tag according to Institute of Electrical and Electronics Engineers (IEEE) 802.1q, a Differentiated Services Code Point (DSCP) value, and a traffic class value according to IEEE 802.1p.

13. A method for providing quality of service (QoS) to packets in an overlay virtual network (OVN), the method comprising:

receiving a packet on a source port;

determining a virtual network associated with the source port;

encapsulating the packet with at least one overlay tunnel header to form an overlay tunnel-encapsulated packet;

storing QoS attributes with the at least one overlay tunnel header, the QoS attributes being determined at least in part by the virtual network; and sending the overlay tunnel-encapsulated packet via an overlay tunnel, wherein the at least one overlay tunnel header having QoS attributes stored therein comprises a Layer-2 (L2) QoS field storing L2 QoS attributes including L2 priority information for the packet and a Layer-3 (L3) QoS field storing L3 QoS attributes including a type of service (TOS) value indicating L3 priority information, and wherein the L2 and L3 QoS attributes comprise at least one of: a virtual local area network (VLAN) tag according to Institute of Electrical and Electronics Engineers (IEEE) 802.1q, a Differentiated Services Code Point (DSCP) value, and a traffic class value according to IEEE 802.1p, wherein the VLAN tag is appended to an end of an outer media access control (MAC) header of the overlay tunnel-encapsulated packet, and wherein the DSCP value is appended to an end of an outer internet protocol (IP) header of the overlay tunnel-encapsulated packet.

14. The method as recited in claim 8, wherein the virtual network associated with the source port is determined from QoS attributes included in a header of the packet.

15. A method for providing quality of service (QoS) to packets in an overlay virtual network (OVN), the method comprising:

receiving a packet on a source port;

determining a virtual network associated with the source port;

encapsulating the packet with at least one overlay tunnel header to form an overlay tunnel-encapsulated packet;

storing QoS attributes with the at least one overlay tunnel header, the QoS attributes being determined at least in part by the virtual network; and sending the overlay tunnel-encapsulated packet via an overlay tunnel wherein the virtual network associated with the source port is determined from QoS attributes included in a header of the packet, wherein a virtual network identifier of the virtual network associated with the source port is appended to an end of an outer media access control (MAC) header of the overlay tunnel-encapsulated packet, and wherein a traffic classification value is appended to an end of an outer internet protocol (IP) header of the overlay tunnel-encapsulated packet.

16. A computer program product for providing quality of service (QoS) to packets in an overlay virtual network (OVN), the computer program product comprising a computer readable storage medium having program instructions embodied therewith, the program instructions executable by a processor to cause the processor to perform a method comprising:

receiving, by the processor, a packet on a source port;

determining, by the processor, a virtual network associated with the source port;

encapsulating, by the processor, the packet with at least one overlay tunnel header to form an overlay tunnel-encapsulated packet;

storing, by the processor, QoS attributes with the at least one overlay tunnel header, the QoS attributes being determined at least in part by the virtual network; and sending, by the processor, the overlay tunnel-encapsulated packet via an overlay tunnel, wherein the QoS attributes to store with the at least one overlay tunnel header are determined by consulting a first table, the first table storing virtual network identifiers associated with QoS attributes.

17. The computer program product as recited in claim 16, wherein the method that the program instructions executable by the processor cause the processor to perform further comprises:

sending a list of virtual network identifiers associated with applicable QoS attributes to each switch where presence of workloads associated with a particular virtual network is known or learned;

causing each switch where presence of workloads associated with the particular virtual network is known or learned to associate the particular virtual network with ports which are connected to the particular virtual network;

receiving the overlay tunnel-encapsulated packet via the overlay tunnel;

removing the QoS attributes from the at least one overlay tunnel header;

decapsulating the packet from the overlay tunnel-encapsulated packet to remove the at least one overlay tunnel header;

determining a destination port from the packet; and forwarding the packet to the destination port.

* * * * *